United States Patent [19]

Ezra et al.

[11] Patent Number: 5,602,658
[45] Date of Patent: Feb. 11, 1997

[54] SPATIAL LIGHT MODULATOR AND DIRECTIONAL DISPLAY HAVING CONTINUOUS PARALLAX AND AN INCREASED NUMBER OF 2D VIEWS

[75] Inventors: David Ezra; Graham J. Woodgate, both of Oxfordshire, United Kingdom

[73] Assignee: Sharp Kabushiki Kaisha, Abeno-ku, Japan

[21] Appl. No.: 245,584

[22] Filed: May 18, 1994

[30] Foreign Application Priority Data

May 21, 1993 [GB] United Kingdom ............... 9310548

[51] Int. Cl.⁶ ..................................... G02F 1/1335
[52] U.S. Cl. ..................... 349/95; 349/106; 349/139; 349/145
[58] Field of Search ................... 359/68, 54, 87, 359/40, 67, 61

[56] References Cited

U.S. PATENT DOCUMENTS 5,132,820 7/1992 Someya et al. .................... 359/54

FOREIGN PATENT DOCUMENTS

| 0262955 | 4/1988 | European Pat. Off. . |
| 0387033 | 9/1990 | European Pat. Off. . |
| 0400992 | 12/1990 | European Pat. Off. . |
| 0509630 | 10/1992 | European Pat. Off. . |
| 59-009636 | 1/1984 | Japan . |
| 59-208530 | 11/1984 | Japan ........................ 359/68 |
| 62-257291 | 11/1987 | Japan . |

*Primary Examiner*—William L. Sikes
*Assistant Examiner*—James A. Dudek

[57] ABSTRACT

A spatial light modulator of the LCD type comprises picture elements arranged as rows extending horizontally and columns extending vertically. The picture elements are arranged in groups such that the picture elements of each group are substantially contiguous with each other in the horizontal direction. It is thus possible to provide continuous horizontal parallax of the 2D views and an increased number of such 2D views, for instance by converting to directional information by means of a lenticular screen.

16 Claims, 9 Drawing Sheets

SPATIAL LIGHT MODULATOR AND DIRECTIONAL DISPLAY HAVING CONTINUOUS PARALLAX AND AN INCREASED NUMBER OF 2D VIEWS

The present invention relates to a spatial light modulator and to a directional display.

Such a display may be used to provide three dimensional (3D) displays.

EP-A-0 387 033 and EP-A-0 400 992 disclose frame thinning out systems in which the pixels of a display are grouped into multiple groups, each of which is composed of a plurality of pixels which are contiguous to each other. The number of pixels which are turned on in a frame time period within an integration period is selected in accordance with gradation data. The frame period during which the number of pixels turned on is kept constant is set sufficiently short so as to not cause flicker.

A known 3D display comprises a lenticular screen disposed on the surface of a thin film transistor twisted nematic liquid crystal display. The pitch of the lenticular screen is substantially equal to an integer multiple of the horizontal pitch of the picture elements (pixels) of the liquid crystal display. The pixels are arranged in rows and columns and the display is addressed so that each vertical row of pixels behind respective lenticules of the lenticular screen contains information representing a two dimensional (2D) view of an object. The lenticular screen allows each of the 2D views to be replayed in the appropriate direction so as to give the appearance of a 3D image.

Known types of liquid crystal display (LCD) have a number of disadvantages which degrade the quality of a 3D image produced in this way. Firstly, the resolution of thin film transistor twisted nematic LCDs is limited by the thin film transistor response, by the addressing schemes, and by low production yields. This results in a limitation in the number of views which can be obtained while maintaining an adequate horizontal resolution in each of the 2D images.

Secondly, the use of thin film transistors at each pixel requires the use of a black mask which prevents light from passing through the transistors. The black mask extends between adjacent columns of pixels and is imaged by the lenticular screen to give a region of no information in the image between adjacent 2D views. Thus, the output of the 3D display does not have continuous parallax.

The use of a lenticular screen comprising elongate cylindrically converging lenticules results in information in one direction only i.e. horizontally, being decoded as directional information. The horizontal resolution of the LCD dictates the number of 2D views which can be displayed. However, in general, the horizontal and vertical pixel resolutions of LCDs are substantially equal so that, for a display of the type providing four 2D views, the horizontal resolution of display is one quarter of the vertical resolution.

According to a first aspect of the invention, there is provided a spatial light modulator as defined in the appended claim 1.

According to a second aspect of the invention, there is provided a directional display including a modulator in accordance with the first aspect of the invention.

Preferred embodiments of the invention are defined in the other appended claims.

It is thus possible to provide a pixel structure in a spatial light modulator and in a directional display, such as a 3D display, which allows both horizontal and vertical information to be decoded as directional information with continuous parallax between the 2D views. This can be achieved using resolutions of pixels available with existing modulators and displays. It is also possible to make use of both vertical and horizontal resolution to increase the number of views which can be displayed.

The invention will be further described, by way of example, with reference to the accompanying drawings, in which.

Throughout the drawings, like reference numerals refer to like parts.

Figure 1:
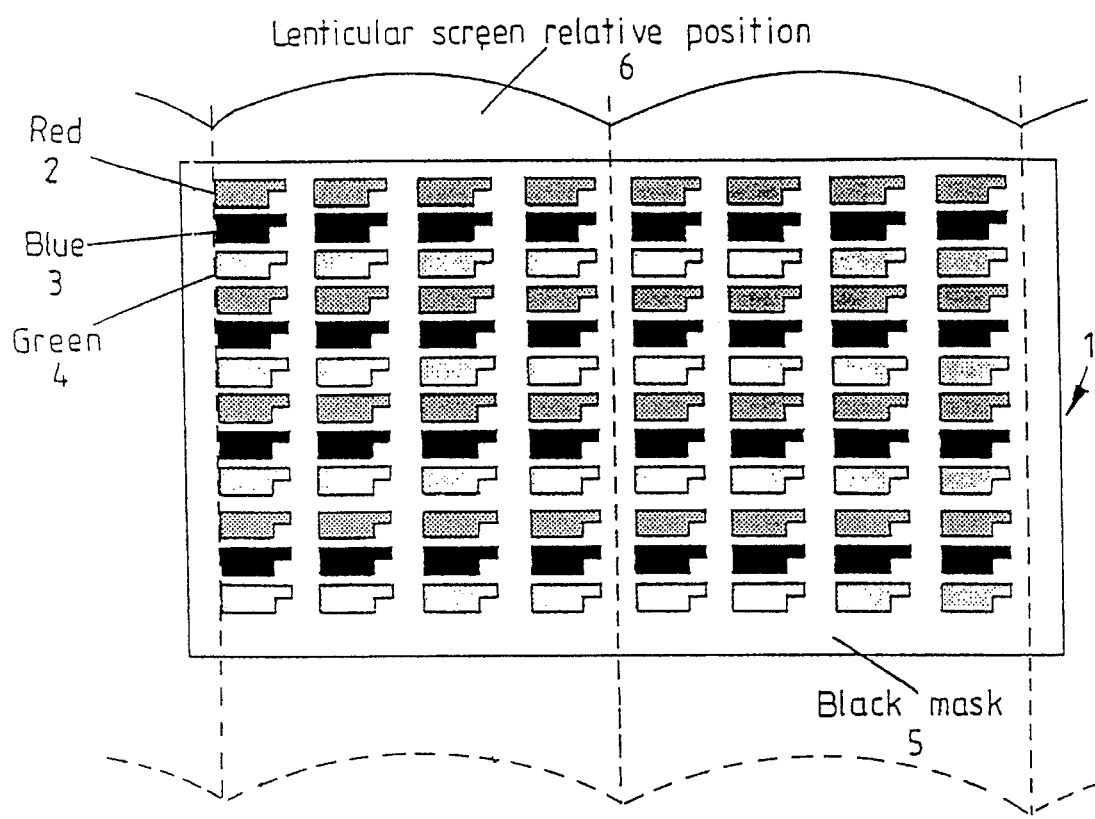
FIG. 1 is a diagrammatic front view of a known type of 3D display making use of a LCD.

The known type of LCD shown in FIG. 1 comprises a plurality of pixels arranged as rows and columns in a regular pattern or array. The LCD 1 provides a colour display and comprises red pixels 2, blue pixels 3, and green pixels 4. The LCD 1 is of the thin film transistor twisted nematic type and the pixels are separated from each other by a black mask 5. Thus, each column of pixels is separated from each adjacent column by a continuous vertical opaque strip of the black mask 5, which prevents light from passing through the thin film transistors of the LCD 1.

In order to provide a 3D display, a lenticular screen 6 is disposed in front of the pixels of the LCD 1. The lenticular screen 6 comprises a plurality of vertically extending lenticules, each of which is optically cylindrically converging. The lenticules extend vertically and may be formed, for instance, as plano-convex cylindrical lenses or as graded refractive index (GRIN) cylindrical lenses. Each lenticule is disposed above a plurality of columns of pixels (four columns as shown in FIG. 1) and each column of pixels provides a vertical slice of a 2D view. The shape of each pixel is rectangular with a small rectangular extension projecting from the right side of each pixel.

Figure 2:
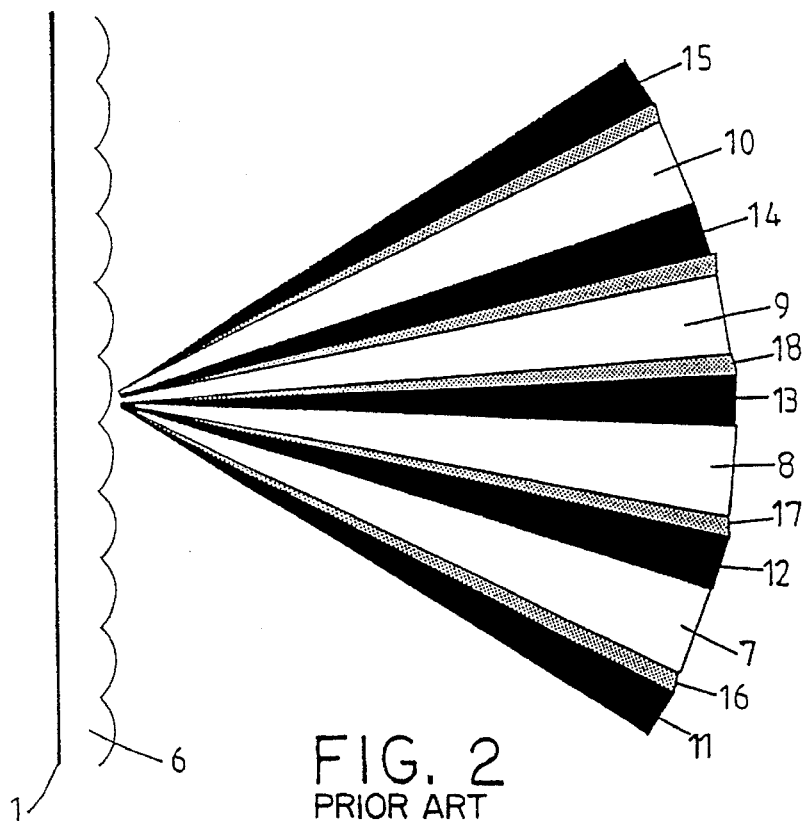
FIG. 2 is a plan view illustrating operation of the display of FIG. 1.

As illustrated in FIG. 2, when the 3D display is suitably illuminated from behind and image data are supplied to the pixels of the LCD 1 such that each column of pixels displays a thin vertical slice of a 2D image, each lenticule of the screen 6 provides output light beams 7 to 10 from the respective four columns of pixels associated with the lenticule. The directions in which the light beams 7 to 10 extend correspond to the directions from which the respective 2D views were recorded during image capture. When viewed by an observer whose eyes receive adjacent ones of the light beams 7 to 10, a 3D image is perceived.

However, the vertical portions of the black mask 5 between the columns of pixels are also imaged in the directions indicated at 11 to 15. Further, the light beams 7 to 10 contain regions such as 16 to 18 of reduced brightness corresponding to imaging of the rectangular protrusions extending from the main pixel regions. Thus, the output of the display does not have continuous parallax.

Figure 3:
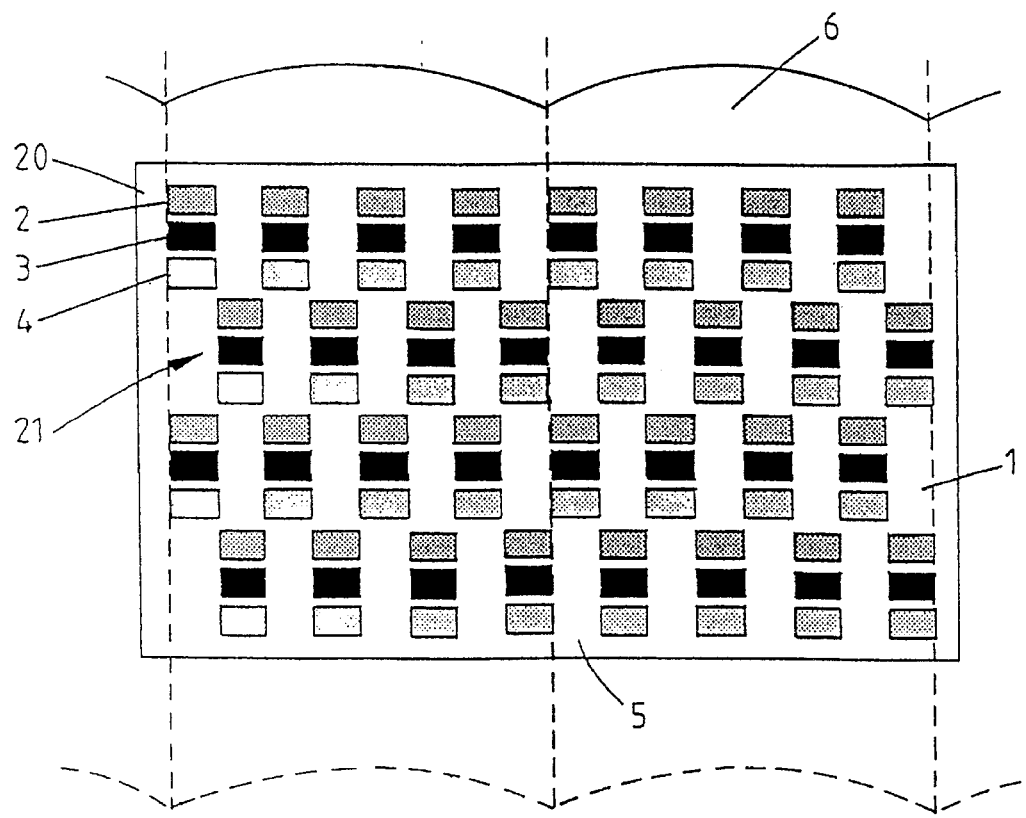
FIG. 3 is a diagrammatic front view of a 3D display including a LCD constituting a first embodiment of the invention.

The 3D display shown in FIG. 3 comprises a LCD 1 and a lenticular screen 6. The LCD 1 differs from that shown in FIG. 1 in that the pixels are arranged in a different pattern of horizontal rows and vertical columns. In particular, each pixel may be a composite pixel comprising a red pixel 2 a blue pixel 3 and a green pixel 4. The pixels are arranged such that they are contiguous in the horizontal direction. In other words, there are no continuous vertical black mask portions separating the pixels. To achieve this, each composite pixel 20 in a first row is spaced vertically from a horizontally adjacent composite pixel 21 in a second row but the right hand edge of the composite pixel 20 lies on the same vertical line as the left hand edge of the composite pixel 21. Thus, compared with FIG. 1, the number of columns of pixels imaged by each lenticule of the screen 6 has been doubled to 8 whereas the vertical resolution of the LCD 1 has effectively been halved.

Figure 4:
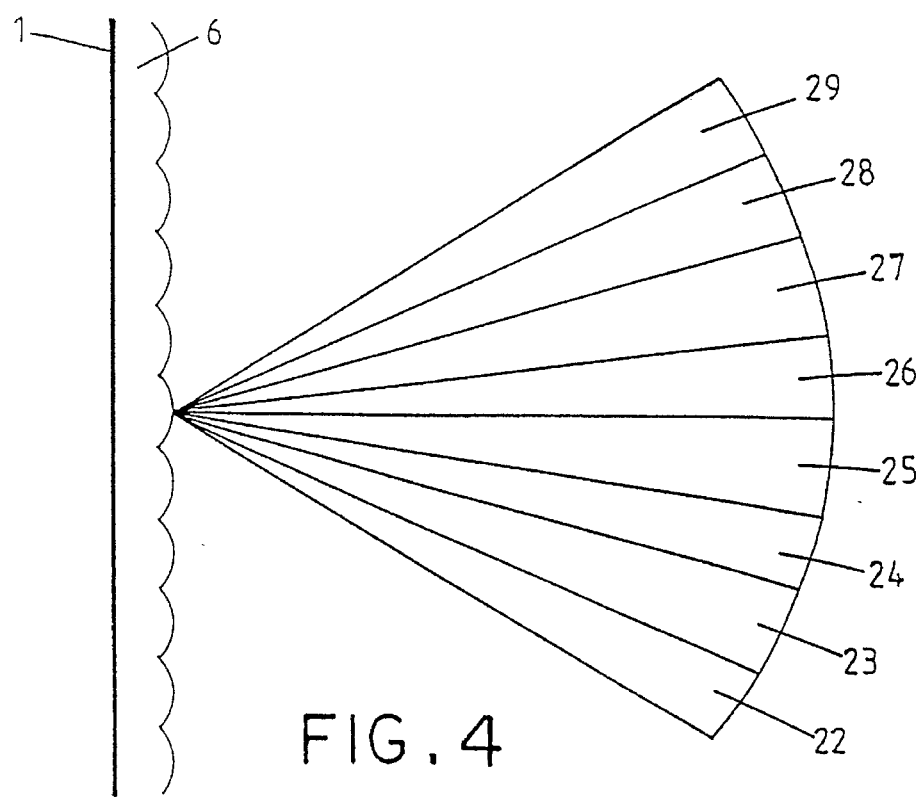
FIG. 4 is a plan view illustrating operation of the display of FIG. 3.

As shown in FIG. 4, each lenticule of the screen 6 supplies eight output light beams 22 to 29 which are angularly contiguous with each other and which represent eight different 2D views with continuous horizontal parallax. Thus, "black" regions such as 11 and "grey" regions such as 16 in FIG. 2 are eliminated and an observer can perceive a 3D image of substantially constant intensity and without image gaps. Further, the number of 2D views for the or each 3D image frame is doubled by halving the vertical resolution.

Figure 5:
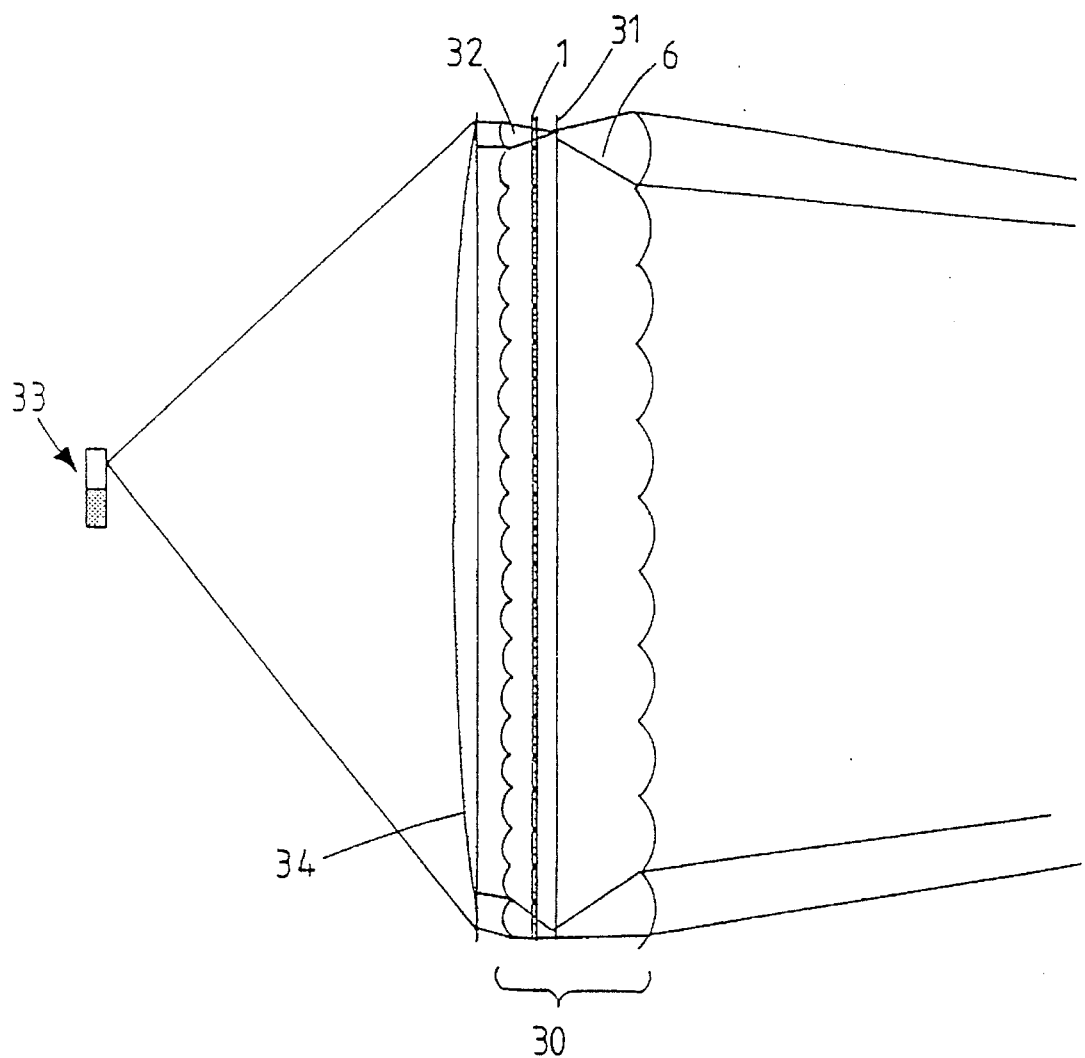
FIG. 5 is a diagrammatic cross sectional view of a 3D display constituting a second embodiment of the invention.

The advantages are achieved by the display of FIG. 3 at the cost of reduced light throughput because of the increased area of the black mask 5 compared with the display of FIG. 1, the 2D views being made up of alternate lines with a black line between, and loss of vertical resolution. However, for many applications, the advantages far outway the costs and allow an improved 3D display to be obtained. FIG. 5 illustrates that the LCD 1 and lenticular screen 6 shown in FIG. 3 may be used in a "hybrid sandwich" arrangement 30 of the type disclosed in British Patent Application No.9210399.3. In addition to the LCD 1 and the screen 6, the hybrid sandwich 30 comprises a diffuser 31 and an "input" lenticular screen 32 which is similar to the screen 6 but whose lenticular pitch is substantially equal to the pitch of the columns of pixels of the LCD 1. The hybrid sandwich 30 is illuminated by means of a plurality of sequentially illuminatable light sources 33 (two light sources shown in the drawing) and a correction lens 34. Operation of this 3D display is described in the above mentioned British patent application, to which attention is directed.

Figure 6:
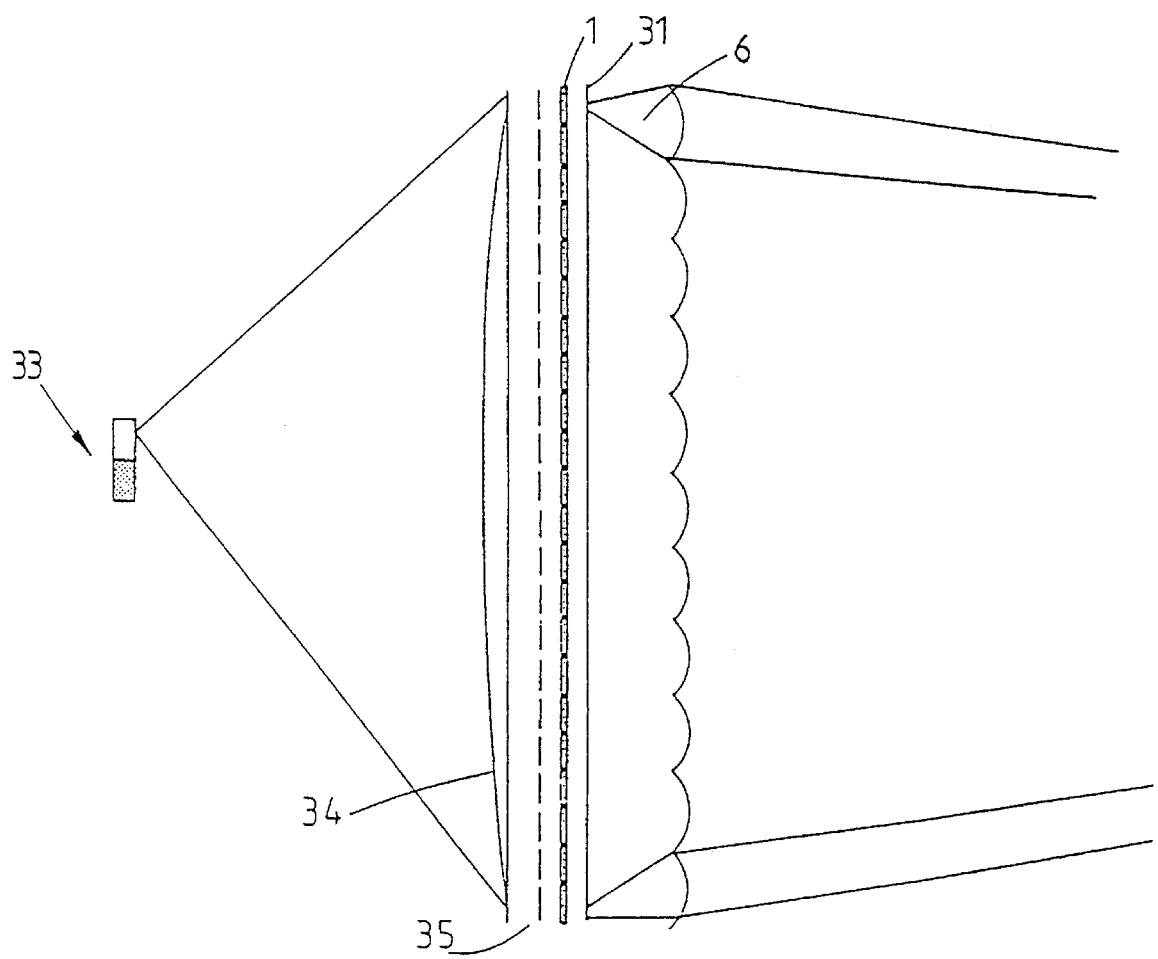
FIGS. 6 to 8 are views similar to FIG. 5 of modified embodiments of the inventions.

FIG. 6 illustrates a modified form of the 3D display of FIG. 5 in which the input lenticular screen 32 is replaced by a parallax barrier 35 having a plurality of vertical slits corresponding to and having the same pitch as the lenticules of the screen 32.

Figure 7:
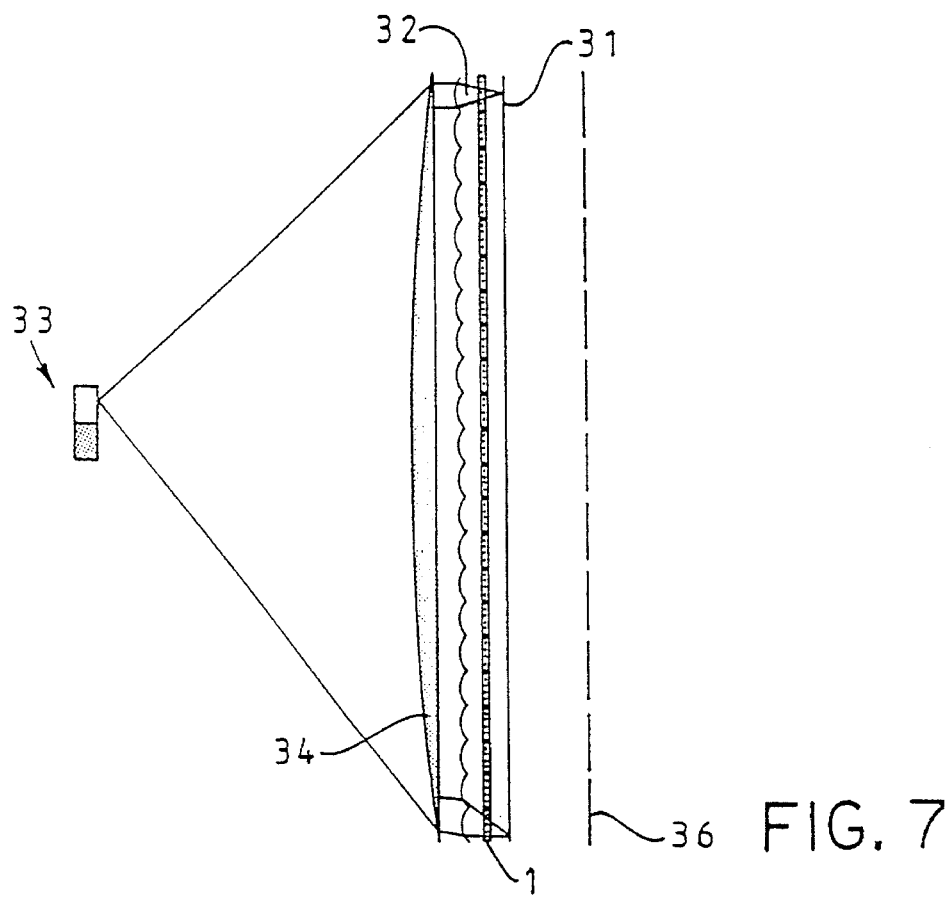

FIG. 7 illustrates a display which differs from that shown in FIG. 5 in that the output lenticular screen 6 is replaced by an output parallax barrier 36 having a plurality of vertical slits corresponding to and with the same spacing as the lenticules of the screen 6.

Figure 8:
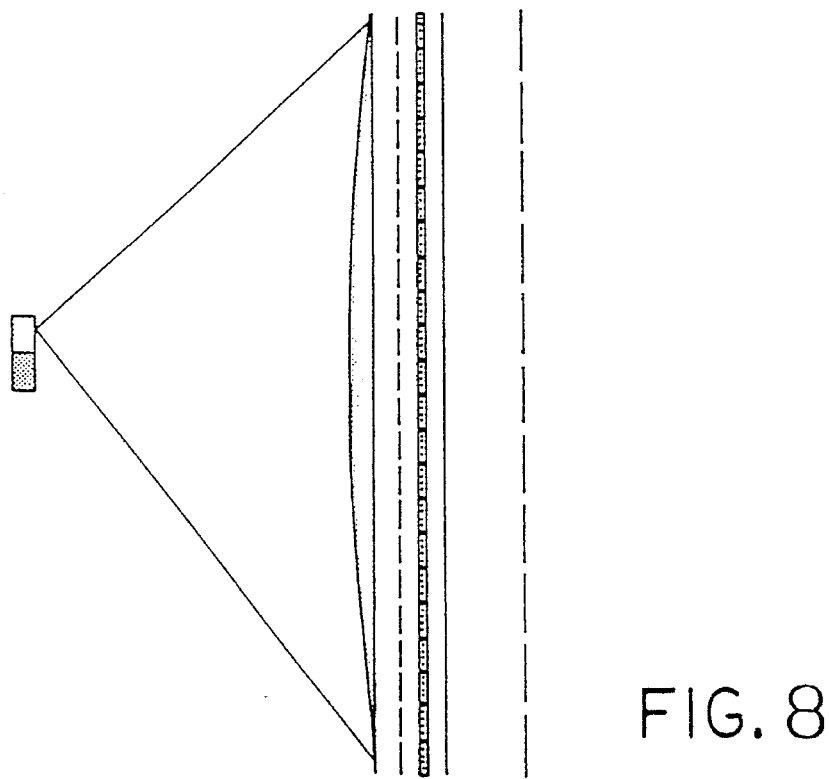

FIG. 8 illustrates a further modified embodiment which differs from that shown in FIG. 5 in that the lenticular screen 6 is replaced by the parallax barrier 36 of FIG. 7 and the lenticular screen 32 is replaced by the parallax barrier 35 of FIG. 6.

Figure 9:
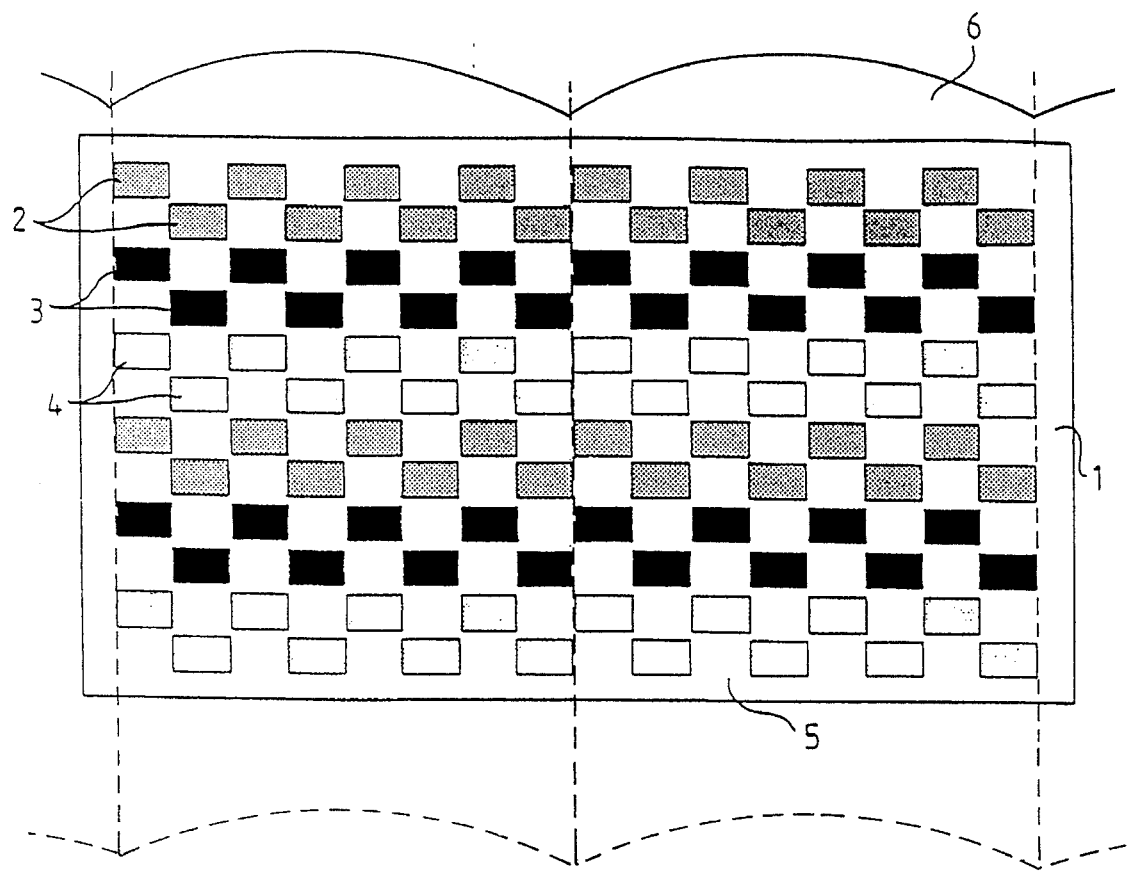
FIG. 9 is a diagrammatic front view of a 3D display incorporating a LCD constituting a third embodiment of the invention.

FIG. 9 illustrates a 3D display in which the LCD 1 differs from that of FIG. 3 in that the individual colour pixels 2, 3, and 4 are arranged as shown. Thus, by mixing two adjacent view colour pixels, the effect of the black line between alternate lines of each 2D view as mentioned hereinbefore is substantially reduced to give more "mixing" between the adjacent rows of pixels.

Figure 10:
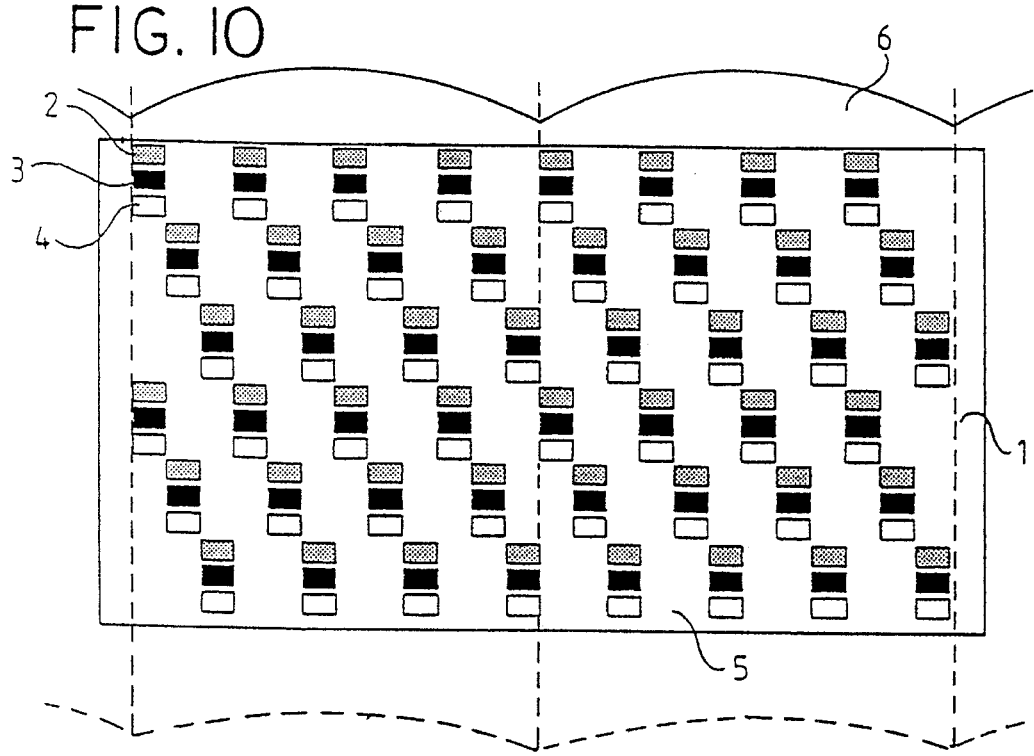
FIG. 10 is a diagrammatic front view of a 3D display incorporating a LCD constituting a fourth embodiment of the invention.

FIG. 10 illustrates a 3D display which differs from that shown in FIG. 3 in that the number of 2D views is increased by a factor of 3 compared with the type of display shown in FIG. 1. This is achieved at the cost of vertical resolution, which becomes a third of that of the display of FIG. 1. As in the displays of FIGS. 3 and 9, the pixels are arranged such that there are no continuous vertical columns of the black mask 5. Thus, the display of FIG. 10 provides continuous horizontal parallax for twelve 2D views making up a complete 3D image or frame.

Figure 11:
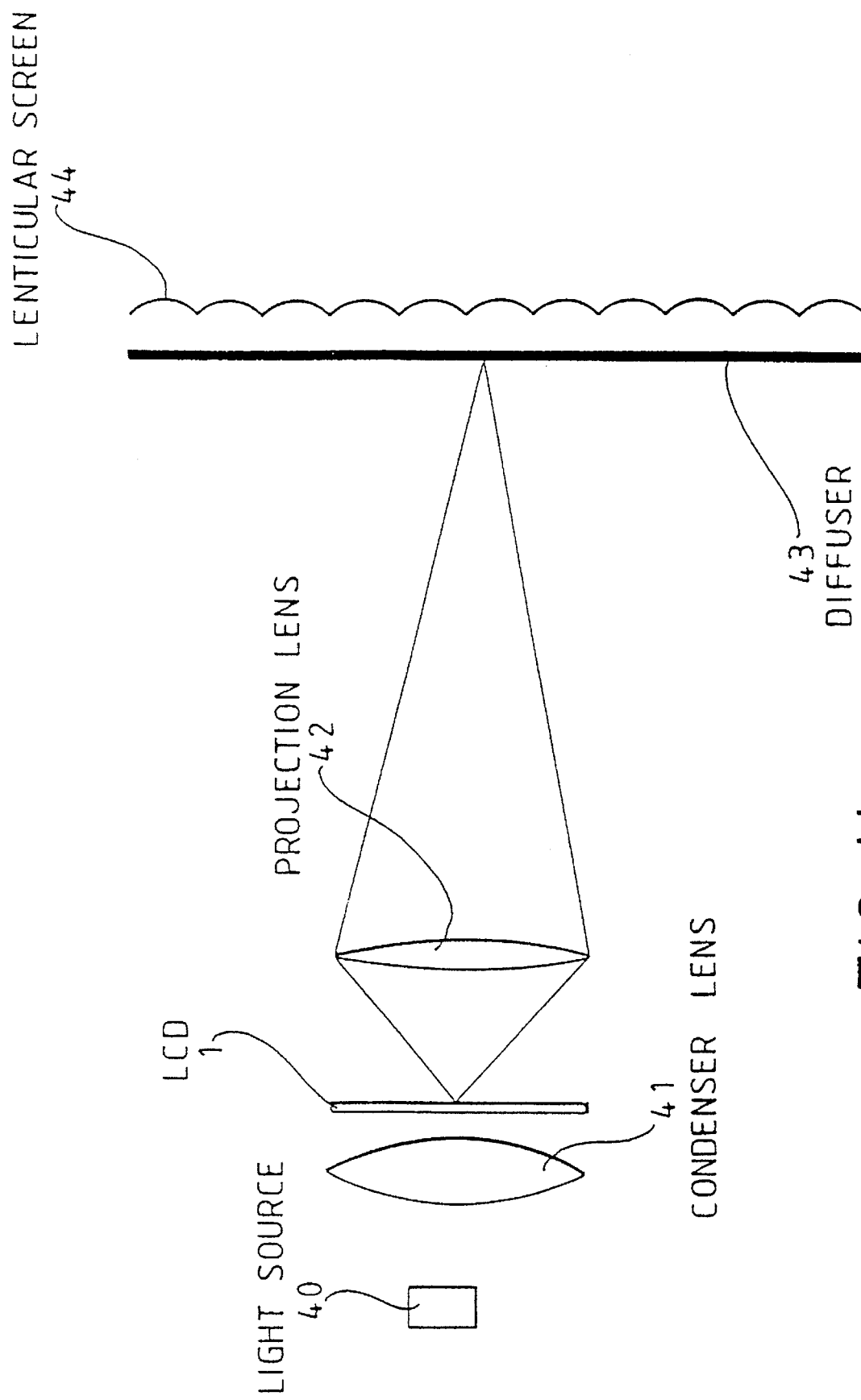
FIG. 11 is a diagrammatic plan view of a 3D display constituting a fifth embodiment of the invention.

FIG. 11 illustrates another type of 3D display which uses a LCD 1 of the type shown in FIG. 3, FIG. 9, or FIG. 10. The display comprises a light source 40 which illuminates the LCD 1 via a condenser lens 41. A projection lens 42 projects images of the pixels onto a diffuser 43 in front of which is disposed a lenticular screen 44 of the same type as the screen 6 but with a lenticular pitch which is increased in proportion to the ratio of the horizontal pitches of the pixel images at the diffuser 43 and the pixels of the LCD 1. Thus, the 3D display of FIG. 11 provides continuous horizontal parallax and an increased number of 2D views in return for reduced vertical resolution.

Figure 12:
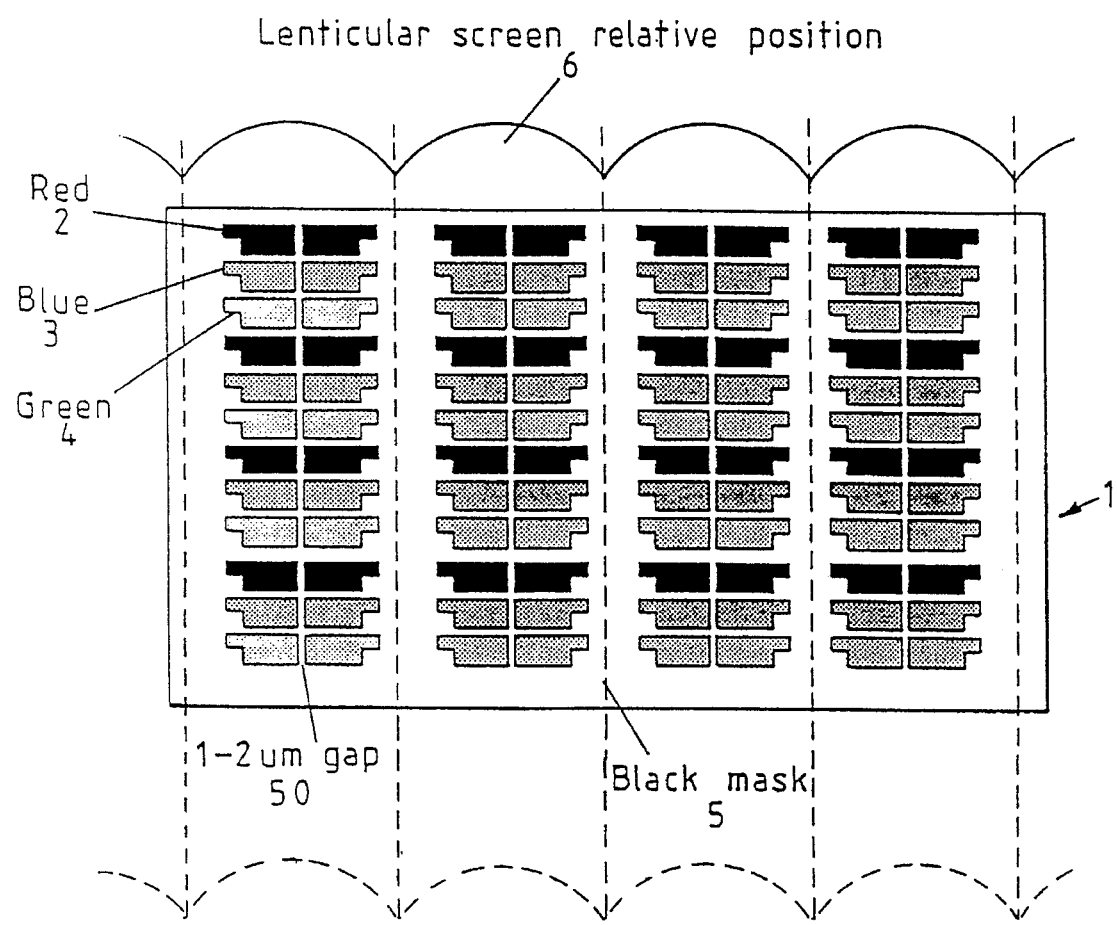
FIG. 12 is a diagrammatic front view of a 3D display incorporating a LCD constituting a sixth embodiment of the invention.

FIG. 12 illustrates a 3D display in which the LCD 1 differs from that of FIG. 3 in that it provides 2D views making up a complete 3D image or frame. Under each lenticule of the lenticular screen 6, the pixels are arranged as two columns, each of which represents a vertical slice of one of the 2D views. Corresponding pixels in the two columns are disposed in the same row and red, blue, and green pixels 2, 3, and 4, respectively are arranged as composite pixels. The columns are separated by a gap 50 having a width of 1 to 2 micrometers. Thus, although the pixels in the columns below each lenticule are not absolutely contiguous with each other, the gap 50 is so small as to be imperceptible to a viewer. Thus, the pixels in the two columns are substantially contiguous horizontally.

Figure 13:
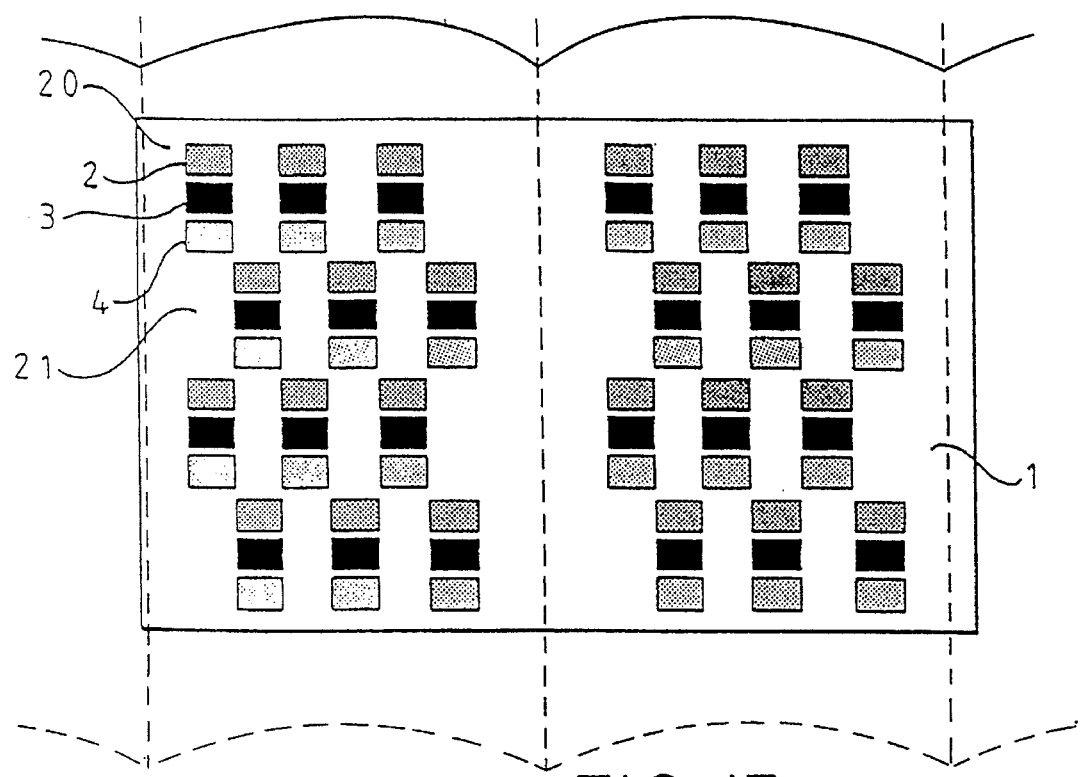
FIG. 13 is a diagrammatic front view of a 3D display constituting a further embodiment of the present invention.
Figure 14:
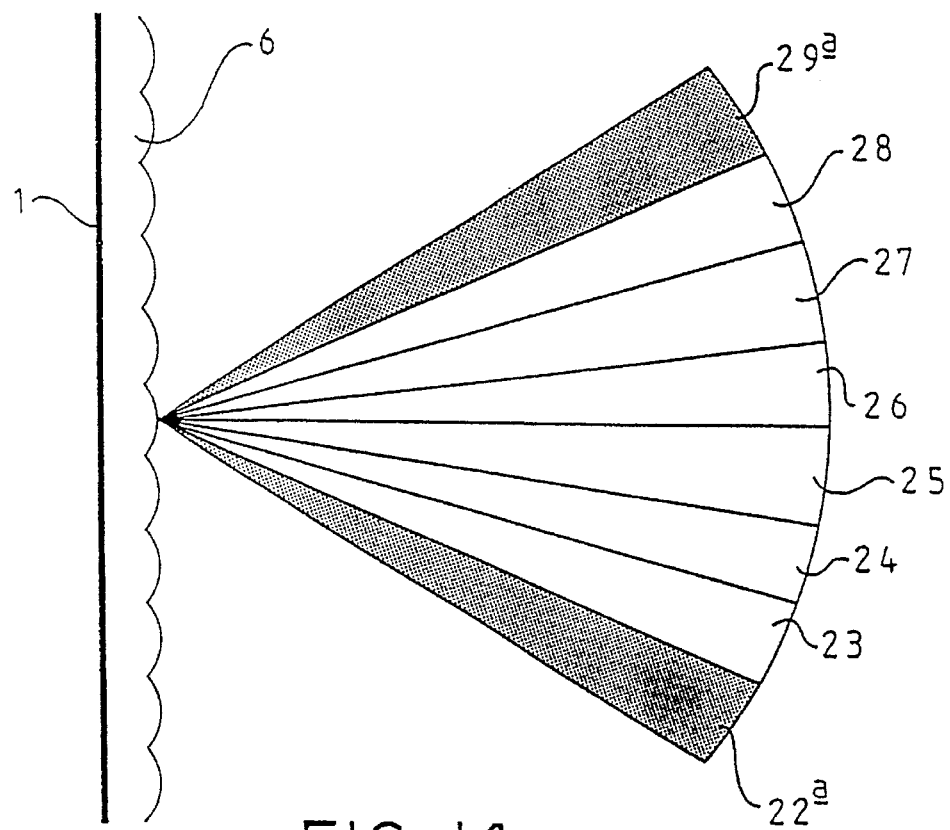
FIG. 14 is a plan view illustrating operation of the display of FIG. 13.

FIG. 13 illustrates a 3D display which is similar to the display illustrated in FIG. 3, but which also has similarities with the display shown in FIG. 12 since gaps separate each group of pixels 20, 21 (associated with a respective lenticule) of the LCD from the or each adjacent group of pixels. This arrangement results in gaps occurring at the edges of the viewing lobes, i.e. lobes 22a and 29a, as shown in FIG. 14. Such an arrangement may improve the ease of visibility of the 3D image.

It is thus possible to provide a LCD and a 3D display in which the loss of image as an observer moves laterally with respect to the display, caused by areas of grey and black in the display output, can be eliminated or substantially reduced. Vertical resolution can be sacrificed in order to provide increased numbers of 2D views so as to improve the quality of the 3D image provided by the display. Displays of this type may be used for 3D television, 3D computer aided design and graphics, 3D medical imaging, virtual reality, and computer games. Further, such displays may be used to provide directional information display other than 3D image information.

What is claimed is:

1. A spatial light modulator comprising a plurality of picture elements arranged as rows extending in a first direction and columns extending in a second direction substantially perpendicular to the first direction, and having opaque regions masking conductors and/or drive devices within the spatial light modulator, the picture elements being arranged in groups of N, where N is an integer greater than one, wherein the picture elements of each group are substantially contiguous with each other in the first direction so that an edge of picture elements in a column lies on the same vertical line as an edge of picture elements of a horizontally adjacent column.

2. A spatial light modulator as claimed in claim 1, wherein the picture elements of each group are disposed in respective adjacent rows.

3. A spatial light modulator as claimed in claim 1, wherein each of the picture elements has the shape of a parallelogram with a first pair of parallel sides extending in the first direction and a second pair of parallel sides extending in the second direction.

4. A spatial light modulator as claimed in claim 1, wherein each of the picture elements comprises a plurality of sub-elements of different colors.

5. A spatial light modulator as claimed in claim 1, wherein the picture elements of each group are offset in the second direction with respect to neighboring picture elements by an amount which is less than the dimension of the picture elements in the second direction.

6. A spatial light modulator as claimed in claim 1, wherein the groups of picture elements are substantially contiguous with each other in the first direction.

7. A spatial light modulator as claimed in claim 1, wherein the spatial light modulator is a liquid crystal device.

8. A spatial light modulator as claimed in claim 7, wherein the spatial light modulator is a thin film transistor twisted nematic type display.

9. A directional display including a modulator, the modulator comprising a plurality of picture elements arranged as rows extending in a first direction and columns extending in a second direction substantially perpendicular to the first direction, and the modulator having opaque regions masking conductors and/or drive devices within the modulator, the picture elements being arranged in groups of N, where N is an integer greater than one, wherein the picture elements of each group are substantially contiguous with each other in the first direction so that an edge of picture elements in a column lies on the same vertical line as an edge of picture elements of a horizontally adjacent column.

10. A display as claimed in claim 9, further comprising a first lenticular screen having a plurality of elongate cylindrically converging lenses which extend in the second direction and each of which is aligned with N columns of picture elements.

11. A display as claimed in claim 9, further comprising a first parallax barrier having a plurality of slits which extend in the second direction and each of which is aligned with N columns of picture elements.

12. A display as claimed in claim 10, further comprising a second lenticular screen having a plurality of elongate cylindrically converging lenses which extend in the second direction and each of which is aligned with a respective column of picture elements.

13. A display as claimed in claim 11, further comprising a lenticular screen having a plurality of elongate cylindrically converging lenses which extend in the second direction and each of which is aligned with a respective column of picture elements.

14. A display as claimed in claim 10, further comprising a parallax barrier having a plurality of slits which extend in the second direction and each of which is aligned with a respective column of picture elements.

15. A display as claimed in claim 11, further comprising a second parallax barrier having a plurality of slits which extend in the second direction and each of which is aligned with a respective column of picture elements.

16. A spatial light modulator comprising a plurality of picture elements arranged as rows extending in a first direction and columns extending in a second direction substantially perpendicular to the first direction, and having opaque regions masking conductors and/or drive devices within the spatial light modulator, the picture elements being arranged in groups of N, where N is an integer greater than one, wherein the picture elements of each group are substantially contiguous with each other in the first direction so that at least one edge of picture elements in a column lies on the same vertical line as an edge of picture elements of a column horizontally adjacent to that at least one edge.

* * * * *